United States Patent
Brückner et al.

(10) Patent No.: US 11,858,338 B2
(45) Date of Patent: Jan. 2, 2024

(54) DEVICE FOR CLOSING A MOTOR VEHICLE COOLING MODULE

(71) Applicant: HBPO GmbH, Lippstadt (DE)

(72) Inventors: Reinhold Brückner, Herzebrock-Clarholz (DE); Christian Schneider, Bad Lippspringe (DE)

(73) Assignee: HBPO GmbH, Lippstadt (DE)

( * ) Notice: Subject to any disclaimer, the term of this patent is extended or adjusted under 35 U.S.C. 154(b) by 153 days.

(21) Appl. No.: 17/440,045

(22) PCT Filed: Mar. 5, 2020

(86) PCT No.: PCT/EP2020/055897
§ 371 (c)(1),
(2) Date: Sep. 16, 2021

(87) PCT Pub. No.: WO2020/187590
PCT Pub. Date: Sep. 24, 2020

(65) Prior Publication Data
US 2022/0185099 A1 Jun. 16, 2022

(30) Foreign Application Priority Data
Mar. 18, 2019 (DE) ...................... 10 2019 106 828.2

(51) Int. Cl.
*B60K 11/00* (2006.01)
*B60K 11/08* (2006.01)

(52) U.S. Cl.
CPC .................................. *B60K 11/085* (2013.01)

(58) Field of Classification Search
CPC .............................. B60K 11/085; B60K 11/00
(Continued)

(56) References Cited

U.S. PATENT DOCUMENTS 9,365,106 B2 * 6/2016 Brückner ............. B60K 11/085
9,446,660 B2 * 9/2016 Asai ..................... B62D 25/085
(Continued)

FOREIGN PATENT DOCUMENTS

DE   102011009778 A1   8/2012
DE   202016103900 U1   8/2016
(Continued)

OTHER PUBLICATIONS

Office Action for German Application No. 10 2019 106 828.2 dated Feb. 28, 2020, with its English translation, 7 pages.
(Continued)

*Primary Examiner* — Hau V Phan
(74) *Attorney, Agent, or Firm* — Peter W. Schroen; Bret E. Field; Bozicevic, Field & Francis LLP (57) ABSTRACT

The invention relates to a device (2) for closing a motor vehicle cooling module, comprising: a closure element (4) for closing air inlets (6) in a motor vehicle; a guide element (8) for guiding the closure element (4) during an opening and a closing movement; and a control element (10) for controlling an opening and a closing movement of the closure element (4); wherein the closure element (4) and the guide element (8) are arranged with respect to one another and can be controlled by the control element (10) in such a way that air inlets (6) in a motor vehicle can be opened and closed by the closure element (4) along a vehicle width (B); wherein, at the same time, two air inlets (6) arranged opposite one another along a vehicle width (B) can be opened and closed by the closure element (4).

21 Claims, 7 Drawing Sheets

(58) Field of Classification Search
USPC ........................................................ 180/68.1
See application file for complete search history.

(56) References Cited

U.S. PATENT DOCUMENTS

| | | | | |
|---|---|---|---|---|
| 10,093,173 | B1* | 10/2018 | Frayer | B60K 11/085 |
| 10,183,573 | B1* | 1/2019 | Klop | B60K 11/085 |
| 2010/0243352 | A1* | 9/2010 | Watanabe | B60K 11/085 |
| | | | | 180/68.1 |
| 2010/0282438 | A1* | 11/2010 | Wirth | B60K 11/085 |
| | | | | 165/67 |
| 2012/0305818 | A1* | 12/2012 | Charnesky | B60K 11/085 |
| | | | | 251/212 |
| 2013/0068403 | A1* | 3/2013 | Fenchak | B60K 11/085 |
| | | | | 160/218 |
| 2013/0264047 | A1* | 10/2013 | Charnesky | B60K 11/085 |
| | | | | 165/41 |
| 2014/0094104 | A1* | 4/2014 | Manhire | B60K 11/085 |
| | | | | 454/152 |
| 2014/0273806 | A1* | 9/2014 | Frayer, III | B60K 11/085 |
| | | | | 454/335 |
| 2014/0295749 | A1* | 10/2014 | Hijikata | B60K 11/085 |
| | | | | 454/256 |
| 2015/0152744 | A1* | 6/2015 | Le Boulicaut | F01D 25/24 |
| | | | | 415/200 |
| 2015/0183313 | A1* | 7/2015 | Bruckner | B60K 11/085 |
| | | | | 180/68.1 |
| 2015/0274002 | A1* | 10/2015 | Vacca | B60H 1/00678 |
| | | | | 264/572 |
| 2017/0021720 | A1* | 1/2017 | Anderson | B60K 11/085 |
| 2017/0050510 | A1* | 2/2017 | Manhire | B60R 19/52 |
| 2017/0144533 | A1* | 5/2017 | Gilotte | B62D 25/085 |
| 2017/0248066 | A1* | 8/2017 | Wolf | B60K 11/085 |
| 2017/0361879 | A1* | 12/2017 | Frayer | B62D 35/00 |
| 2018/0163863 | A1* | 6/2018 | Ogawa | F16H 61/66259 |
| 2018/0312052 | A1* | 11/2018 | Gillard | B60K 11/085 |
| 2019/0009667 | A1 | 1/2019 | Steffen et al. | |
| 2019/0023121 | A1* | 1/2019 | Tran | B60K 11/085 |
| 2019/0023122 | A1* | 1/2019 | Herlem | B60K 11/085 |

FOREIGN PATENT DOCUMENTS

| | | |
|---|---|---|
| DE | 102017120631 A1 | 3/2019 |
| FR | 2738779 A1 | 3/1997 |
| GB | 2524887 A | 10/2015 |
| WO | WO2018158513 A1 | 9/2018 |

OTHER PUBLICATIONS

Written Opinion for PCT Application No. PCT/EP2020/055897 dated Feb. 11, 2021, with its English translation, 8 pages.
International Preliminary Patentability Report for PCT Application No. PCT/EP2020/055897 dated Jun. 7, 2021, with its English translation, 24 pages.

* cited by examiner

DEVICE FOR CLOSING A MOTOR VEHICLE COOLING MODULE

The present invention relates to a device for closing a motor vehicle cooling module.

In state-of-the-art vehicles, in particular motor vehicles, fresh air flowing in through a radiator grill of the vehicle or through the openings of the radiator grill is channeled and directed onto a cooling module of the vehicle. In particular, this targeted channeling of the air flow onto the cooling module can ensure that, depending on the configuration of the cooling module, for example an engine of the vehicle and/or charge air for this engine can be efficiently cooled and/or the vehicle interior can be efficiently air-conditioned.

The inflowing air stream disadvantageously generates turbulent flows that counteract the movement of the vehicles in question and lead to reduced ranges or increased fuel consumption. To solve this problem, roller blind systems are known from the prior art that can close the air intakes located inside the engine compartment as needed and thus reduce the generation of turbulent flows. However, the systems known from the prior art for closing air intakes arranged in the engine compartment have the problem that they are not capable of opening or closing, as required, only partial areas of a vehicle interior arranged symmetrically to one another on opposite sides along the width of the vehicle. For example, in many motor vehicles, brake air ducts are arranged on the outer areas of the motor vehicle front areas, which, disadvantageously, cannot usually be closed separately.

It is therefore the object of the present invention to at least partially eliminate the above-mentioned disadvantages of known closure systems. In particular, it is the object of the invention to provide a device for closing a motor vehicle cooling module, which enables, in a simple and cost-effective manner, the most precise, controllable and flexibly operable opening and closing of air intakes of a vehicle arranged along a vehicle width.

The above object is solved by a device with the features of the independent device claim. Further features and details of the invention result from the dependent claims, the description and the drawings.

According to the invention, a device for closing a motor vehicle cooling module is provided, which has a closure element for closing air intakes in a motor vehicle, a guide element for guiding the closure element during an opening and a closing movement, and a control element for controlling an opening and a closing movement of the closure element. In accordance with the invention, the closure element and the guide element are arranged relative to one another and can be controlled by the control element in such a way that air intakes in a motor vehicle can be opened and closed by the closure element along a vehicle width, it being possible for two air intakes arranged opposite one another along a vehicle width to be opened and closed simultaneously by the closure element.

The present device for closing a motor vehicle module can preferably be arranged in the front area of a motor vehicle, in particular between a radiator grill or a front hood and a motor vehicle cooling module. In addition to being used in passenger cars and trucks, the device according to the invention can likewise be used in other motorized vehicles, such as ships or flying objects or the like. Preferably, an opening operation and a closing operation can be performed by an interaction between the subject control element and the guide element according to the invention and the closure element to close or open air intakes arranged along a width of the vehicle. Such air intakes can be configured, for example, in the form of brake air ducts or supply air ducts for the engine compartment or for an air conditioning system or the like. The present closure element can preferably be brought into any number of intermediate positions, so that, in addition to a fully open and a fully closed state, it is preferably also possible to realize partially open or partially closed states. In the context of the invention, opening and closing along a vehicle width means in particular a horizontal movement with respect to a vehicle width.

Within the scope of the invention, it has been recognized that by moving a closure element along a vehicle width, the movement being effected simultaneously from two positions arranged opposite one another along a vehicle width and symmetrically converging towards one another or moving away from one another, partial areas of an engine compartment arranged symmetrically along a vehicle width can be cooled as required. In this way, it is possible in particular to ventilate or cool, for example, brake air ducts arranged exclusively in the side areas of a vehicle front, so that the generation of turbulent flows is reduced to a minimum. This increases the range of a vehicle and reduces fuel consumption to a minimum.

With regard to a particularly lightweight configuration and an opening and closing process that is at the same time simple and gentle on the material, it can be provided in accordance with the invention in particular that the closure element is configured in the form of a textile. In order to ensure the most effective possible shielding of an air flow, the closure element is preferably configured in the form of an at least partially air-impermeable textile, which is preferably configured from a synthetic material which is as tear-resistant as possible, such as polyester or polyamide or the like. The closure element may also be provided with an at least partially air-impermeable coating or the like. Preferably, the closure element further has a dirt-repellent surface, or is provided with a dirt-repellent coating or the like. With regard to a simple and flexible guidance of the closure element during an opening and a closing movement, the closure element can furthermore advantageously have a fabric thickness of 0.15 to 0.3 mm, in particular a fabric thickness of 0.25 mm.

Within the scope of a constructively simple possibility of an opening and closing process that is as symmetrical as possible, it can further be provided according to the invention that the closure element is configured from a first and a second partial closure element, which preferably have essentially the same surface area. By using two partial closure elements, it is in particular easier to attach the closure elements correspondingly symmetrically to the guide element and to control an opening and a closing process correspondingly symmetrically by the control element.

In order to ensure stable attachment of the closure element to the control element, according to the invention it can further be provided that the closure element has a first finishing strip arranged within a first finishing area and a second finishing strip arranged within a second finishing area for attachment to the control element. The finishing strips can preferably be configured from plastic and can be detachably or non-detachably connected to the closure element. The finishing strips can preferably comprise holes for attaching a cable or the like, which are advantageously arranged along the finishing strips perpendicular to the opening or closing movement of the closure element.

With regard to a space-saving and compact arrangement as well as a simultaneously effective and low-wear guidance of the closure element during an opening and a closing movement, it can also be provided within the scope of the invention that the guide element is configured in the form of a winding shaft onto which the closure element is wound during an opening movement and from which the closure element is unwound during a closing movement.

In order to enable the simplest possible symmetrical opening and closing of air intakes arranged opposite one another along a vehicle width, it is advantageous if the guide element is arranged essentially centrally between the first and second finishing areas of the closure element during an opening and closing movement. In this way, the guide element is arranged centrally in the system and, when arranged in a vehicle, preferably along the vehicle vertical axis, so that the guide element forms the mirror symmetry axis of the system with regard to a symmetrical opening and closing process along a vehicle width.

In order to ensure a structurally simple possibility of attaching the closure element to the guide element, in particular in the case of a one-piece configuration of the closure element in question, it can be provided according to the invention that the guide element is configured in two parts and comprises a first partial guide element and a second partial guide element, which are preferably configured in the form of half-shell-shaped elements that are connected to one another along the longitudinal axis of the guide element. The first and second partial guide elements can be configured in particular in such a way that the closure element can be clamped between the partial guide elements. In this way, in addition to a structurally simple possibility of attaching, in particular a reversible type of attachment can be ensured.

Also with regard to a space-saving and compact arrangement as well as a simultaneously precise, effective and low-wear control of the closure element during an opening and a closing movement, it can be provided within the scope of the invention that the control element comprises a shaft and in each case a first and a second cable pull arranged on the shaft, the first cable pull being connected to the first finishing area of the closure element and the second cable pull being connected to the second finishing area of the closure element. The control element may in this case preferably be arranged adjacent to and, when arranged in a vehicle, behind the guide element in the direction of travel, and unwind the closure element from the guide element or wind it onto the guide element via the first and second cable pulls. The first and second cable pulls can preferably be configured in the form of thin and stable wires, in particular in the form of fine ropes made of stainless steel or the like. The first and second cable pull can be attached in particular to the finishing strips of the closure element.

In the context of a particularly stable and robust configuration, the cable pulls can also be configured in the form of Bowden cables or the like.

With regard to an arrangement which can be regarded as space-saving and compact, in particular in combination with the guide element according to the invention, it can also be provided within the scope of the invention that the control element is configured and connected to the closure element via the first and second cable pulls in such a way that the cable pulls are unwound from the control element during an opening movement and are wound onto the control element during a closing movement.

In this case, it is advantageous with regard to the most constant possible traction if the control element is arranged essentially centrally between the first and second finishing areas of the closure element during an opening and a closing movement.

In order to ensure that the cable pulls are guided with as little wear as possible and, in addition, that the traction on the closure element is as constant as possible, it can also be provided in accordance with the invention that a first and a second guide roller are provided for guiding the first and second cable pull, the guide rollers being arranged opposite one another, preferably at the same distance from the control element, in particular at the same height as the control element. With regard to the most constant possible traction, it is also advantageous if the control element is arranged centrally between the guide rollers in relation to the vehicle width when arranged in a vehicle.

With regard to a preferably constant traction on the closure element during an opening and a closing process, it can further be provided according to the invention that the control element is at least partially conically shaped, preferably double conically shaped, wherein a first conically shaped part is connected, in particular along a waisted area, to a second conically shaped part. In this case, the conification serves in particular to compensate for the increase or decrease in diameter caused by the unwinding and winding of the closure element around the guide element.

For the purpose of exerting a permanent traction during an opening and a closing process, it can also be provided in accordance with the invention that the closure element is connected to the control element via a first and a second tension means, the tension means preferably being configured in the form of tension springs. With regard to a particularly simple configuration, the closure element can be, for example, connected to the first and second cable pull via tension springs. With regard to a reasonable selection of tension means, tension means for exerting a traction or spring force of 20 to 50 N, preferably of 30 to 40 N, in particular for exerting a traction or spring force of 35 N, are advantageously suitable for common applications of closure systems for motor vehicle modules.

In order to ensure remotely controllable opening and closing of a closure element, it is further advantageous if a guide means is provided for guiding the control element. The guide means can preferably be configured in the form of an actuator, in particular in the form of a rotary actuator.

With regard to a constructively simple control of the control element and/or the guide element, it can be provided in accordance with the invention in particular that the guide element and the control element are connected to one another via a gear mechanism, preferably a first gear being arranged on the guide element and a second gear being arranged on the control element, and the first and the second gear being arranged with respect to one another in such a way that the guide element can be guided via the control element. In this case, the guide element can be guided via the control element in a simple manner in that the second gear arranged on the control element is guided via the guide means and engages in the first gear arranged on the guide element. The gear transmission can be configured in the form of a 1:1 transmission or, for example, a 2:1 transmission.

With a view to a stable and low-wear arrangement which can withstand even greater forces, it can also be provided in accordance with the invention that a frame and/or a grid is provided to receive and support the closure element. In addition to receiving or supporting the closure element, the frame and/or the grid may also be provided for arranging or fixing the guide element and/or the guide means. Alternatively or additionally to a grid, a different kind of support, for example a curved and/or beveled support, may be provided to continuously hold the closure element under a slight bias.

With regard to an automated adaptation of the positioning of the device according to the invention to determinable variables, such as a current speed, a current consumption, a current outside temperature, a current engine temperature, a current brake load, a current tank filling or the like, it can further be advantageously provided that a detection unit is provided for acquiring data for determining a current position of the closure element with respect to a vehicle width and/or a current temperature and/or a current traction and/or a current speed and/or a current energy consumption. Preferably, it may be provided in the context of the invention that the detection unit comprises at least one sensor for detecting said data. In this regard, with respect to a compact and easily replaceable and integrable configuration, it may be particularly advantageous if the detection unit is arranged in the device according to the invention for closing a motor vehicle cooling module. Alternatively, the detection unit can also be arranged remotely from the device and preferably integrated in a control unit or the like.

With regard to an automatable adaptation of a positioning of the device according to the invention, in particular an interaction of sensors of the detection unit with sensors arranged within a vehicle can be carried out advantageously, so that already existing sensor technology can be used in a simple way.

With regard to a particularly precise determination or a control of a positioning of the device according to the invention that is as precisely controllable as possible, it can be advantageously further provided that a processing unit is provided for sending a control command to the guide means on the basis of the acquired data. The processing unit is advantageously capable of processing data on the basis of a plurality of sensors, for example averaging, weighting or the like, in order to additionally increase the informative value of the data before a control command is issued to the guide means on the basis of the processing. For smooth control and communication of the individual components, such as the detection unit, the processing unit and the various sensors with each other, the components can preferably be connected to each other by means of a communication and control line within the scope of a wired configuration. With regard to a particularly flexible, uncomplicated and efficient communication of the individual system units, the individual components can preferably communicate with each other wirelessly or contactlessly on a server or cloud basis and/or via the Internet.

Also, an object of the invention is a motor vehicle comprising a device described above for closing a motor vehicle module.

Further advantages, features and details of the invention will be apparent from the following description, in which embodiments of the invention are described in detail with reference to the drawings. In this connection, the features mentioned in the claims and in the description may each be essential to the invention individually or in any combination.

Figure 1:
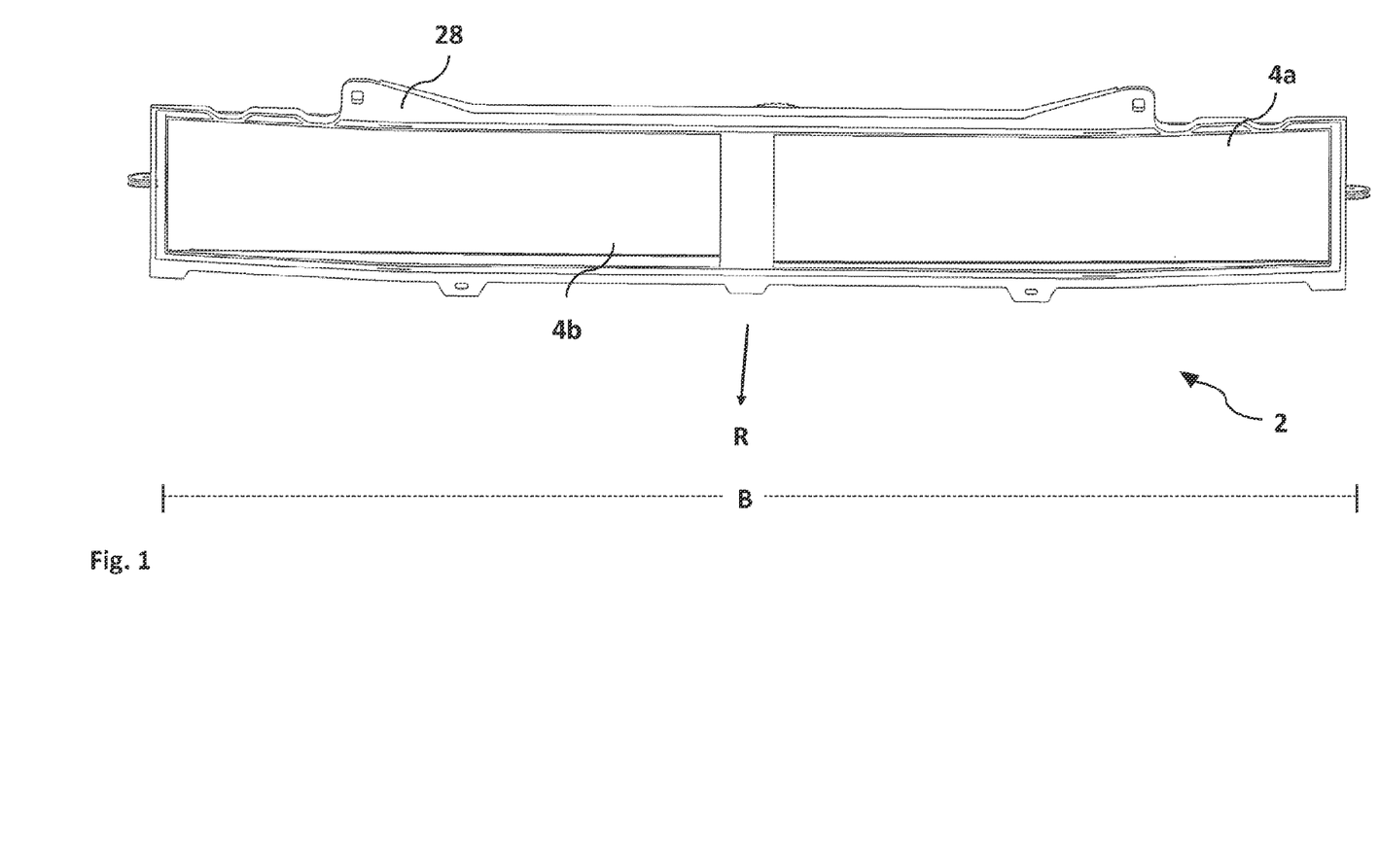
FIG. 1 a schematic representation of a device according to the invention for closing a motor vehicle cooling module in a fully closed state in a front view according to a first embodiment, FIG. 2 a schematic representation of a device according to the invention for closing a motor vehicle cooling module in a fully closed state in a rear view according to a first embodiment, FIG. 3 a schematic representation of a device according to the invention for closing a motor vehicle cooling module in a fully closed state in a front view according to a second embodiment, FIG. 4 a schematic representation of a device according to the invention for closing a motor vehicle cooling module in a fully closed state in a rear view according to a second embodiment, FIG. 5 a schematic representation of the device according to the invention for closing a motor vehicle cooling module according to FIG. 3 in an overhead view, FIG. 6 a schematic representation of a device 2 according to the invention for closing a motor vehicle module in a fully open state in a front view according to a first embodiment, in which in particular the air intakes 6 arranged inside the grill 26 are clearly visible.

In the figures show:

FIG. 1 shows a schematic representation of a device 2 according to the invention for closing a motor vehicle cooling module in a fully closed state in a front view according to a first embodiment. According to the front view, the arrow indicating the direction of travel R points out the plane of the sheet in the present case.

The present device 2 shows a closure element 4 composed of a first and a second partial closure element 4a and 4b, each of which can be opened and closed along a width B of the vehicle. For receiving and supporting the closure element 4, the device 2 further comprises a frame 28 which ensures that the present device 2 can withstand even greater forces and can close air intakes 6 arranged within a vehicle front even at higher guiding speeds of a motor vehicle.

Figure 2:
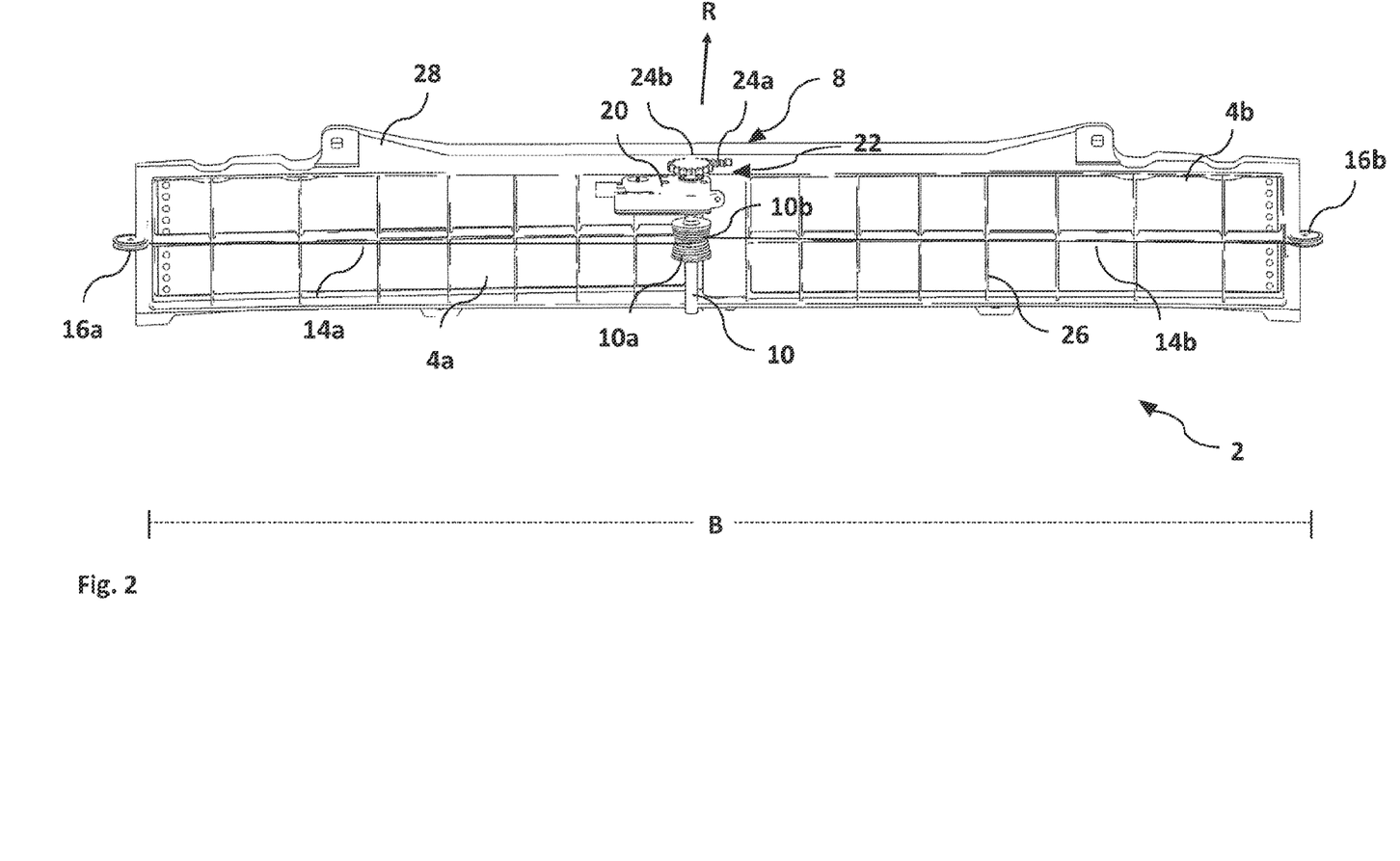

FIG. 2 shows a schematic representation of a device 2 according to the invention for closing a motor vehicle cooling module in a fully closed state in a rear view according to a first embodiment. In accordance with the rear view, the arrow indicating the direction of travel R points into the plane of the sheet.

As can be seen in the rear view, in addition to the closure element 4, comprising a first and second partial closure element 4a, 4b for closing air intakes 6 in a motor vehicle, the device 2 also has a control element 10 for controlling an opening and a closing movement of the closure element 4 and a guide element 8 arranged in front of the control element 10 for guiding the closure element 4 during an opening and a closing movement. The closure element 4 and the guide element 8 are arranged relative to one another and can be controlled by the control element 10 in such a way that air intakes 6 in a motor vehicle can be opened and closed by the closure element 4 along a vehicle width B, it being possible for two air intakes 6 arranged opposite one another along a vehicle width B to be opened and closed simultaneously by the closure element 4.

The present closure element 4 can in this case preferably be configured in the form of a textile, in particular in the form of an at least partially air-impermeable textile, such as for example a polyester or polyamide material. The control element 10 is configured in the present case in the form of a shaft and comprises a first and a second cable pull 14a, 14b, which are connected to the closure element 4 via a guide roller 16a, 16b. The control element 10 is presently further configured and connected to the closure element 4 via the first and second cable pulls 14a, 14b such that the cable pulls 14a, 14b are unwound from the control element 10 during an opening movement and are wound onto the control element 10 during a closing movement. The cable pulls 14a, 14b can be configured in the form of thin and stable wires, preferably in the form of fine cables made of stainless steel or in the form of Bowden cables or the like.

The first and second guide rollers 16a, 16b are arranged at the same distance from the control element 10 and at the same height H as the control element 10, in order to ensure as constant a traction as possible on the closure element 4. In the present case, the control element 10 is of double conical shape, a first conically shaped part 10a being connected along a waisted area to a second conically shaped area 10b. The conification serves in particular to compensate for the increase or decrease in diameter caused by the unwinding and winding of the closure element 4 around the guide element 8.

In addition to the frame 28, a grid 26 is also provided in the present case for receiving and supporting the closure element 4. Alternatively or additionally to a grid 26, a support of a different kind, for example a curved and/or beveled support or the like, may be provided to continuously hold the closure element 4 under a slight bias. A guide means 20 for guiding the control element 10 is further provided on the control element 10, which is formed in the present case in the form of a rotary actuator. The rotary actuator guides the second gear 24b arranged on the control element 10, which engages with the first gear 24a arranged on the guide element and thus also controls the guide element 8. Such a gear transmission 22 may be formed in the form of a 1:1 gear or, for example, in the form of a 2:1 gear.

Figure 3:
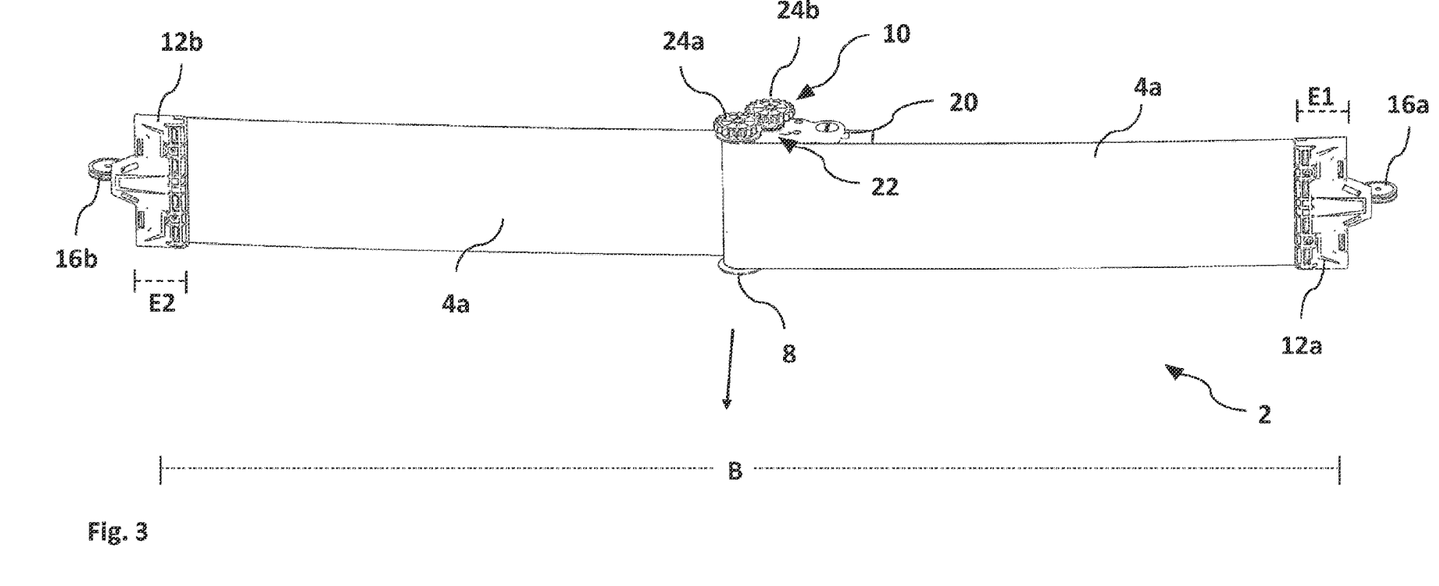

FIG. 3 shows a schematic representation of a device 2 according to the invention for closing a motor vehicle cooling module in a fully closed state in a front view according to a second embodiment.

According to this second embodiment, the device 2 does not comprise a frame 28 or a grid 26 for receiving and supporting the closure element 4. However, according to this second embodiment, the closure element 4 comprises a first finishing strip 12a arranged within a first finishing area E1 and a second finishing strip 12b arranged within a second finishing area E2 for attaching the closure element 4 to the control element 10. The finishing strips 12a, 12b can preferably be formed from plastic or the like and can be detachably or non-detachably connected to the closure element 4. In this regard, the finishing strip may preferably comprise holes for attaching the first and second cable pulls 14a, 14b, which are advantageously arranged along the height, perpendicular to the opening or closing movement of the closure element 4.

Figure 4:
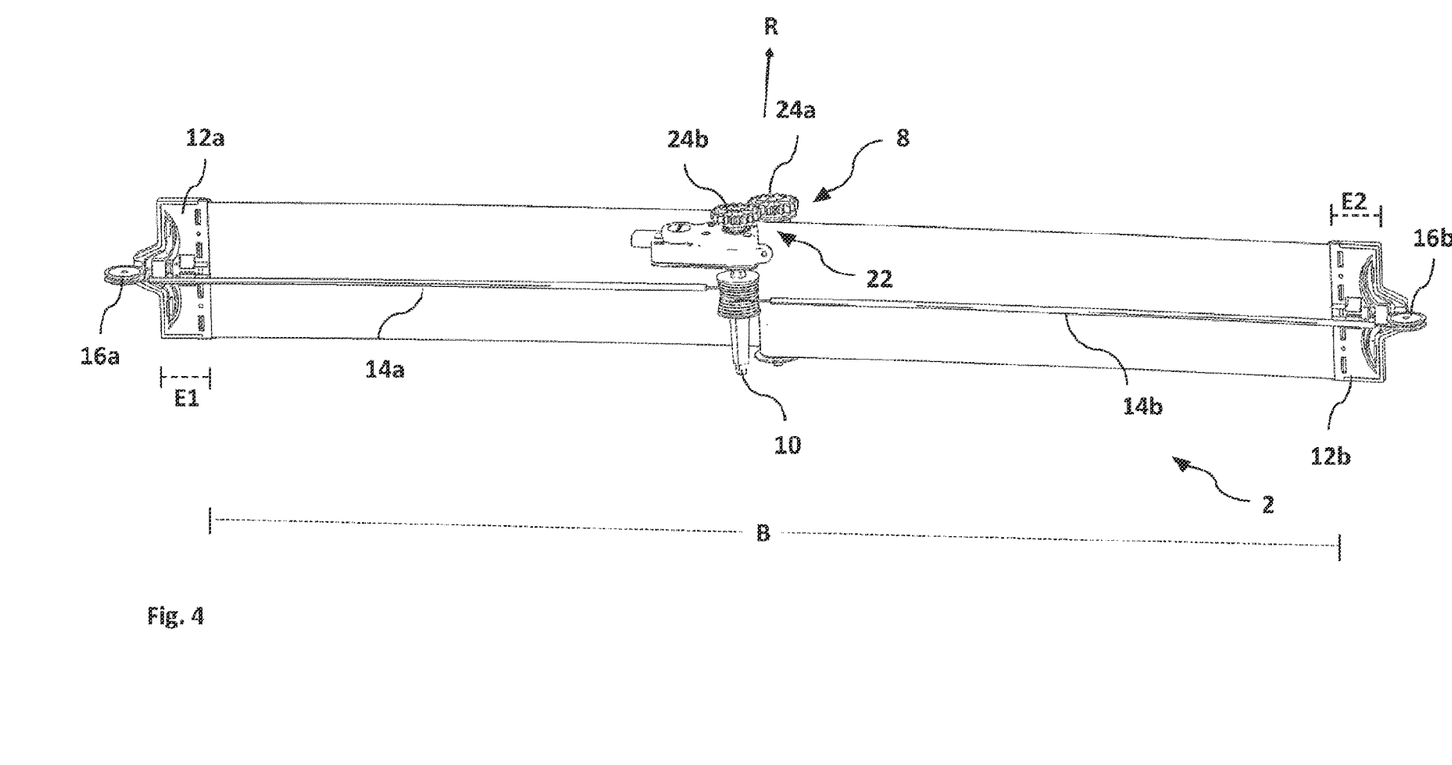

FIG. 4 shows a schematic representation of a device 2 according to the invention for closing a motor vehicle cooling module in a fully closed state in a rear view according to a second embodiment in which the cable pulls 14a, 14b are formed in the form of Bowden cables.

Figure 5:
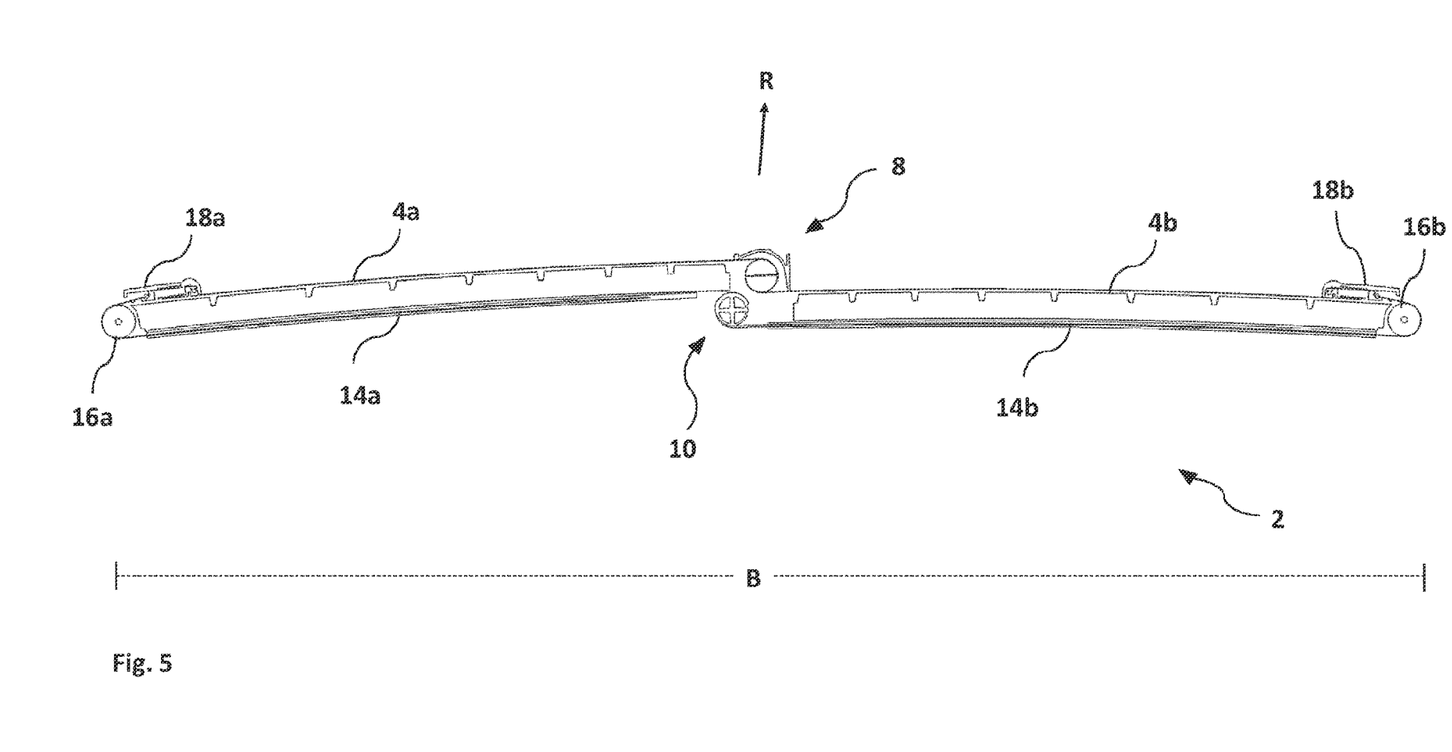

FIG. 5 shows a schematic representation of the device 2 according to the invention for closing a motor vehicle cooling module according to FIG. 3 in an overhead view. According to this representation, a first and a second traction means 18a, 18b can also be seen, with which the control element 10 is connected to the closure element 4 via the first and second cable pulls 14a, 14b. The traction means 18a, 18b are formed in the present case in the form of tension springs and serve to exert a permanent traction on the closure element 4 during an opening and a closing process.

With regard to a reasonable selection of traction means, traction means for exerting a tension or spring force of 20 to 50 N, preferably of 30 to 40 N, in particular for exerting a tension or spring force of 35 N, are advantageously suitable for common applications of closure systems for motor vehicle cooling modules.

Figure 6:
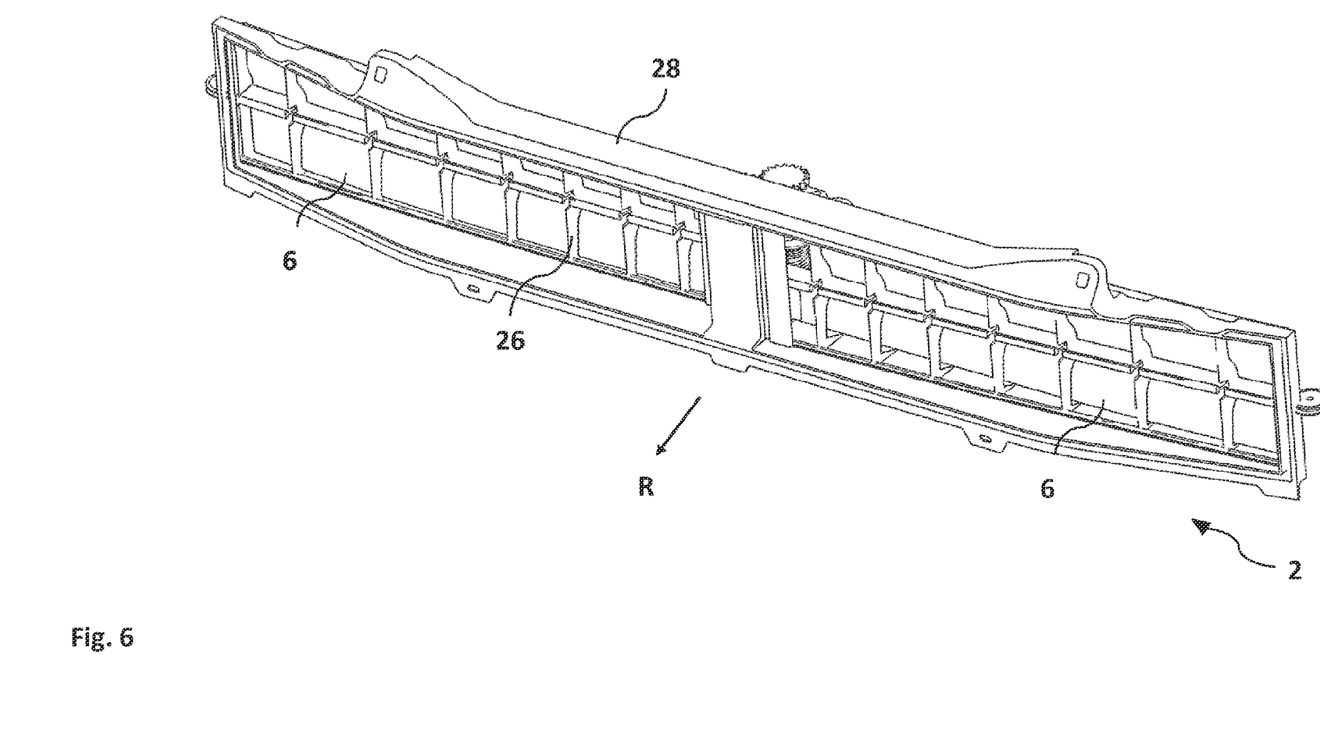

FIG. 6 shows a schematic representation of a device 2 according to the invention for closing a motor vehicle module in a fully open state in a front view according to a first embodiment, in which in particular the air intakes 6 arranged inside the grill 26 are clearly visible.

Figure 7:
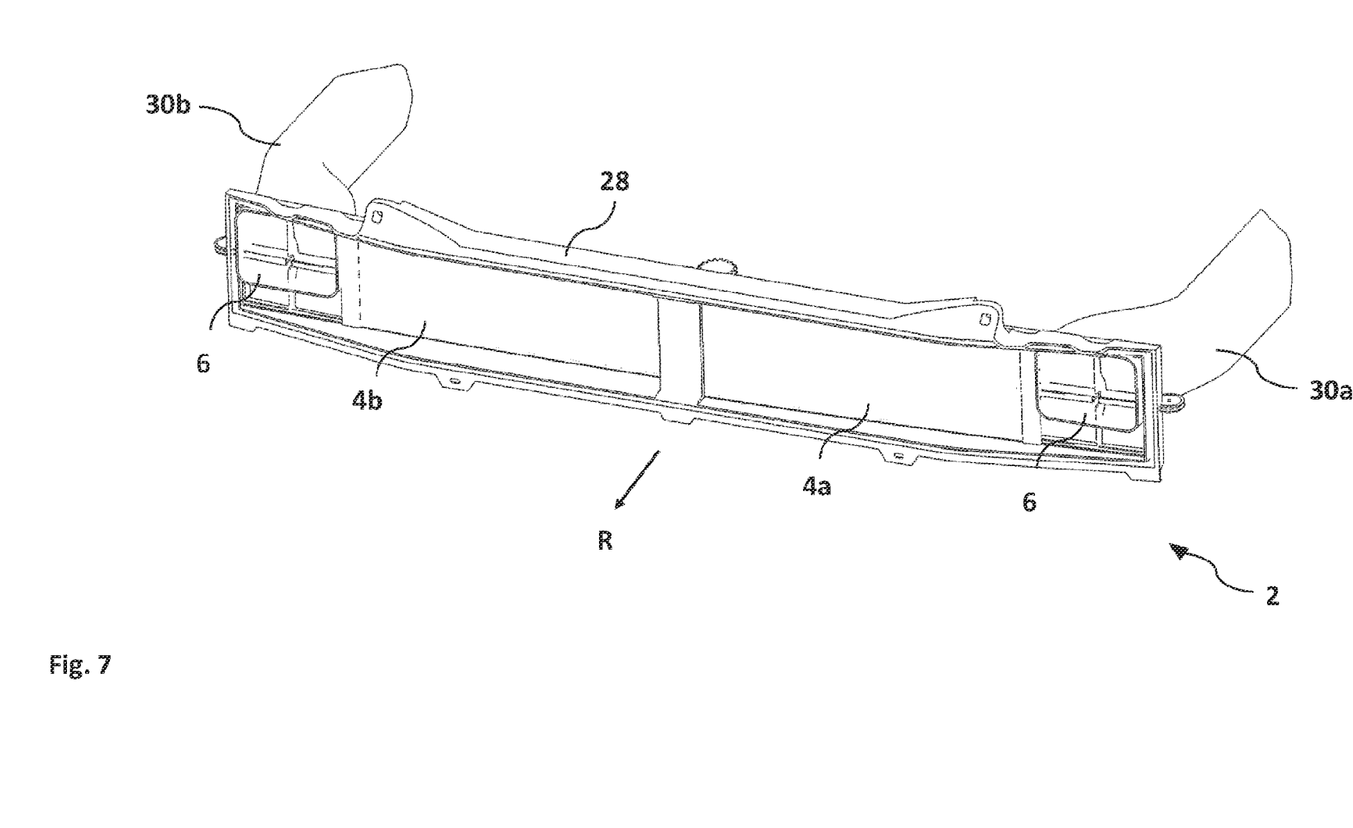
FIG. 7 a schematic representation of a device according to the invention for closing a motor vehicle cooling module in a fully open state in a front view according to a first embodiment.

Finally, FIG. 7 shows a schematic representation of a device 2 according to the invention for closing a motor vehicle module in a partially closed state in a front view according to a further embodiment. In the present case, only the centrally arranged area of a vehicle front is closed by the closure element 4 or the partial closure elements 4a, 4b, whereas the laterally arranged air intakes 6, which allow a cooling flow into the left and right brake air ducts 30b, 30a, are open. In this way, the generation of a turbulent flow, which increases fuel consumption and reduces the range of a vehicle, can be kept to a minimum and released only for absolutely necessary vehicle elements.

By means of the device according to the invention, it is possible in particular to cool partial areas of an engine compartment arranged symmetrically along a vehicle width as required by moving a closure element along a vehicle width, the movement being effected simultaneously from two positions arranged opposite one another along a vehicle width so as to converge symmetrically towards one another or move away from one another. In this way, it is possible in particular, for example, to ventilate or cool only brake air ducts arranged in the side areas of a vehicle front, so that the generation of turbulent flows is reduced to a minimum. This increases the range of a vehicle and reduces fuel consumption to a minimum.

LIST OF REFERENCE SIGNS

2 Device for closing a motor vehicle cooling module
4 Closure element
4a First partial closure element
4b Second partial closure element
6 Air intakes
8 Guide element
8a First partial guide element
8b Second partial guide element
10 Control element
10a First conical shaped area
10b Second conical shaped area
12a First finishing strip
12b Second finishing strip
14a First Cable pull
14b Second Cable pull
16a First guide roller
16b Second guide roller
18a First traction means
18b Second traction means
20 Guide means
22 Gear transmission
24a First gear
24b Second gear
26 Grill
28 Frame
30a Left brake air duct
30b Right brake air duct
R Direction of travel B Vehicle width
E1 first finishing end
E2 Second finishing end
Height H

The invention claimed is:

1. A device for closing a motor vehicle cooling module, comprising:
 a closure element for closing air inlets in a motor vehicle,
 a guide element for guiding the closure element during an opening and a closing movement, and
 a control element for controlling the opening and closing movements of the closure element,
wherein
the closure element and the guide element are arranged with respect to one another and can be controlled by the control element in such a way that air inlets in the motor vehicle can be opened and closed by the closure element along a vehicle width, and two air inlets arranged opposite one another along the vehicle width can be opened and closed simultaneously by the closure element, wherein the closure element is configured in the form of a textile, wherein the control element is at least partially conically shaped, wherein the closure element comprises a first finishing strip arranged within a first finishing area and a second finishing strip arranged within a second finishing area for attachment to the control element, wherein the guide element and the control element are connected to one another via a gear mechanism, a first gear being arranged on the guide element and a second gear being arranged on the control element, and the first and second gear being arranged with respect to one another in such a way that the guide element can be guided via the control element.

2. The device according to claim 1,
wherein
 the first and second partial closure element have essentially the same surface area.

3. The device according to claim 1,
wherein
 the guide element is configured in the form of a winding shaft onto which the closure element is wound during an opening movement and from which the closure element is unwound during a closing movement.

4. The device according to claim 1,
wherein
 the guide element is arranged essentially centrally between the first and second finishing areas of the closure element during an opening and a closing movement.

5. The device according to claim 4,
wherein
 the control element comprises a shaft and in each case a first and second cable pull arranged on the shaft, the first cable pull being connected to the first finishing area of the closure element and the second cable pull being connected to the second finishing area of the closure element.

6. The device according to claim 5,
wherein
 the cable pulls are configured in the form of Bowden cables.

7. The device according to claim 5,
wherein
 the control element is configured and connected to the closure element via the first and second cable pulls in such a way that the cable pulls are unwound from the control element during an opening movement and are wound onto the control element during a closing movement.

8. The device according to claim 7,
wherein
 a first and a second guide roller are provided for guiding the first and second cable pull, the guide roller being arranged opposite one another.

9. The device according to claim 8, wherein the first and a second guide roller are arranged at the same distance from the control element.

10. The device according to claim 4,
wherein
 the control element is arranged essentially centrally between the first and the second finishing area of the closure element during an opening and a closing movement.

11. The device according to claim 1,
wherein
 the guide element is configured in two parts and comprises a first partial guide element and a second partial guide element.

12. The device according to claim 11, wherein the first partial guide element and the second partial guide element are configured in the form of half-shell-shaped elements which are connected to one another along a longitudinal axis of the guide element.

13. The device according to claim 1,
wherein
 the control element is double conically shaped, wherein a first conically shaped portion is connected to a second conically shaped portion.

14. The device according to claim 1,
wherein
 the closure element is connected to the control element via a first and a second tension means, the tension means.

15. The device according to claim 14, wherein the tension means are configured in the form of tension springs.

16. The device according to claim 1,
wherein
 a guide means is provided for guiding the control element.

17. The device according to claim 16, wherein the guide means is configured in the form of an actuator.

18. The device according to claim 1,
wherein
 at least a frame or a grid is provided for receiving and supporting the closure element.

19. The device according to claim 18,
wherein
 a processing unit is provided for sending a control command to the guide means on the basis of the acquired data.

20. The device according to claim 1,
wherein
 a detection unit is provided for acquiring data for determining a current position of the closure element with respect to at least a vehicle width or a current temperature or a current traction stress or a current speed or a current energy consumption.

21. A motor vehicle comprising a device for closing a motor vehicle cooling module, comprising:
 a closure element for closing air inlets in a motor vehicle,
 a guide element for guiding the closure element during an opening and a closing movement, and
 a control element for controlling the opening and closing movements of the closure element, wherein
the closure element and the guide element are arranged with respect to one another and can be controlled by the control element in such a way that air inlets in the motor vehicle can be opened and closed by the closure element along a vehicle width, and two air inlets arranged opposite one another along the vehicle width can be opened and closed simultaneously by the closure element, wherein the guide element and the control element are connected to one another via a gear mechanism, a first gear being arranged on the guide element and a second gear being arranged on the control element, and the first and second gear being arranged with respect to one another in such a way that the guide element can be guided via the control element.

* * * * *